United States Patent
Tomidokoro

(10) Patent No.: US 9,264,651 B2
(45) Date of Patent: Feb. 16, 2016

(54) MOVING IMAGE REPRODUCING APPARATUS CAPABLE OF ADJUSTING DISPLAY POSITION OF INDICATOR FOR MOTION ANALYSIS BASED ON DISPLACEMENT INFORMATION OF FRAMES, AND MOVING IMAGE REPRODUCING METHOD AND RECORDING MEDIUM FOR SAME

(75) Inventor: Yoshinori Tomidokoro, Higashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 434 days.

(21) Appl. No.: 13/116,261

(22) Filed: May 26, 2011

(65) Prior Publication Data
US 2011/0293239 A1    Dec. 1, 2011

(30) Foreign Application Priority Data

May 31, 2010 (JP) ................ 2010-124994

(51) Int. Cl.
*H04N 9/80* (2006.01)
*H04N 5/77* (2006.01)
(Continued)

(52) U.S. Cl.
CPC ............ *H04N 5/772* (2013.01); *A63B 24/0006* (2013.01); *H04N 5/23267* (2013.01); *H04N 5/907* (2013.01)

(58) Field of Classification Search
CPC . A63B 24/006; H04N 5/772; H04N 5/23264; H04N 5/23267; H04N 5/2327
USPC .......... 386/239, 240; 348/169, 208.99, 208.1, 348/208.2, 208.4, 208.6, 208.14
See application file for complete search history.

(56) References Cited

U.S. PATENT DOCUMENTS 5,196,929 A * 3/1993 Miyasaka ..................... 348/169
5,333,061 A * 7/1994 Nakashima et al. ......... 386/264
(Continued)

FOREIGN PATENT DOCUMENTS

JP    6-210034 A    8/1994
JP    10-201898    8/1998
(Continued)

OTHER PUBLICATIONS

Leonard, Eugene, "Considerations Regarding the Use of Digital Data to Generate Video Backgrounds", vol. 87, Aug. 1978, SMPTE Journal.*

(Continued)

*Primary Examiner* — David Harvey
(74) *Attorney, Agent, or Firm* — Holtz, Holtz & Volek PC

(57) ABSTRACT

A moving image reproducing apparatus is provided with CPU 8 and a displaying unit 7. A moving image including plural frames of image is displayed on the display unit 7. CPU 8 sets a display position in one of the frames of image and displays a guide-indicator at the display position, wherein the guide-indicator is used for analyzing a specific motion of a person. CPU 8 displays the guide-indicator on each of the frames of image following the frame of image, in which the display position is set, in an overlapping manner. CPU 8 obtains displacement information of a field angle of each of the reproduced frames of image following the frame of image, in which the display position is set. CPU 8 adjusts the display position based on the displacement information, such that the change of the field angle of each frame of image is cancelled.

10 Claims, 11 Drawing Sheets

(51) Int. Cl.
*A63B 24/00* (2006.01)
*H04N 5/232* (2006.01)
*H04N 5/907* (2006.01)

(56) References Cited

U.S. PATENT DOCUMENTS

| | | | |
|---|---|---|---|
| 5,436,672 A * | 7/1995 | Medioni et al. | 348/591 |
| 5,566,251 A * | 10/1996 | Hanna et al. | 382/284 |
| 5,867,584 A * | 2/1999 | Hu et al. | 382/103 |
| 5,917,553 A * | 6/1999 | Honey et al. | 348/578 |
| 5,947,742 A * | 9/1999 | Katayama | 434/247 |
| 5,973,733 A * | 10/1999 | Gove | 348/208.13 |
| 6,141,060 A * | 10/2000 | Honey et al. | 348/578 |
| 6,181,345 B1 * | 1/2001 | Richard | 345/419 |
| 6,339,431 B1 * | 1/2002 | Ohmori et al. | 345/619 |
| 6,509,926 B1 * | 1/2003 | Mills et al. | 348/143 |
| 6,864,886 B1 * | 3/2005 | Cavallaro et al. | 345/420 |
| 6,940,538 B2 * | 9/2005 | Rafey et al. | 348/157 |
| 7,356,082 B1 * | 4/2008 | Kuhn | 375/240.16 |
| 7,671,892 B2 * | 3/2010 | Watanabe et al. | 348/208.6 |
| 7,880,769 B2 * | 2/2011 | Qi | 348/208.99 |
| 8,073,203 B2 * | 12/2011 | Tang et al. | 382/107 |
| 8,213,689 B2 * | 7/2012 | Yagnik et al. | 382/118 |
| 8,334,877 B2 * | 12/2012 | Saed | 345/619 |
| 8,558,883 B2 * | 10/2013 | Cavallaro et al. | 348/135 |
| 2002/0056136 A1 * | 5/2002 | Wistendahl et al. | 725/135 |
| 2002/0070952 A1 * | 6/2002 | Hoch | 345/647 |
| 2004/0252765 A1 * | 12/2004 | Hosoda | 375/240.16 |
| 2005/0034076 A1 * | 2/2005 | Belhumeur et al. | 715/723 |
| 2006/0061658 A1 * | 3/2006 | Faulkner et al. | 348/207.1 |
| 2006/0252018 A1 * | 11/2006 | Sooch | 434/252 |
| 2007/0109418 A1 * | 5/2007 | Idemura | 348/211.99 |
| 2007/0266312 A1 * | 11/2007 | Ayaki et al. | 715/526 |
| 2008/0052750 A1 * | 2/2008 | Grunnet-Jepsen et al. | 725/109 |
| 2008/0226253 A1 * | 9/2008 | Steinberg et al. | 386/52 |
| 2009/0208061 A1 | 8/2009 | Matsumoto et al. | |
| 2009/0214078 A1 * | 8/2009 | Kuo | 382/103 |
| 2011/0212791 A1 * | 9/2011 | Ueda et al. | 473/221 |
| 2011/0267481 A1 * | 11/2011 | Kagei | 348/211.9 |
| 2011/0305369 A1 * | 12/2011 | Bentley et al. | 382/103 |
| 2012/0105657 A1 * | 5/2012 | Yokohata et al. | 348/208.4 |

FOREIGN PATENT DOCUMENTS

| | | | |
|---|---|---|---|
| JP | 10-210416 A | | 8/1998 |
| JP | 411271890 A | * | 9/1999 |
| JP | 2003-088604 A | | 3/2003 |
| JP | 2005-237494 | * | 9/2005 |
| JP | 2006-230630 | * | 9/2006 |
| JP | 2008-023036 A | | 2/2008 |
| JP | 2008-171280 A | | 7/2008 |
| JP | 2009-020897 A | | 1/2009 |
| JP | 2010-74767 | * | 4/2010 |

OTHER PUBLICATIONS

Japanese Office Action dated Jan. 8, 2013 (and English translation thereof) in counterpart Japanese Application No. 2010-124994.
Chinese Office Action dated Mar. 11, 2013 (and English translation thereof) in counterpart Chinese Application No. 201110147007.2.

* cited by examiner

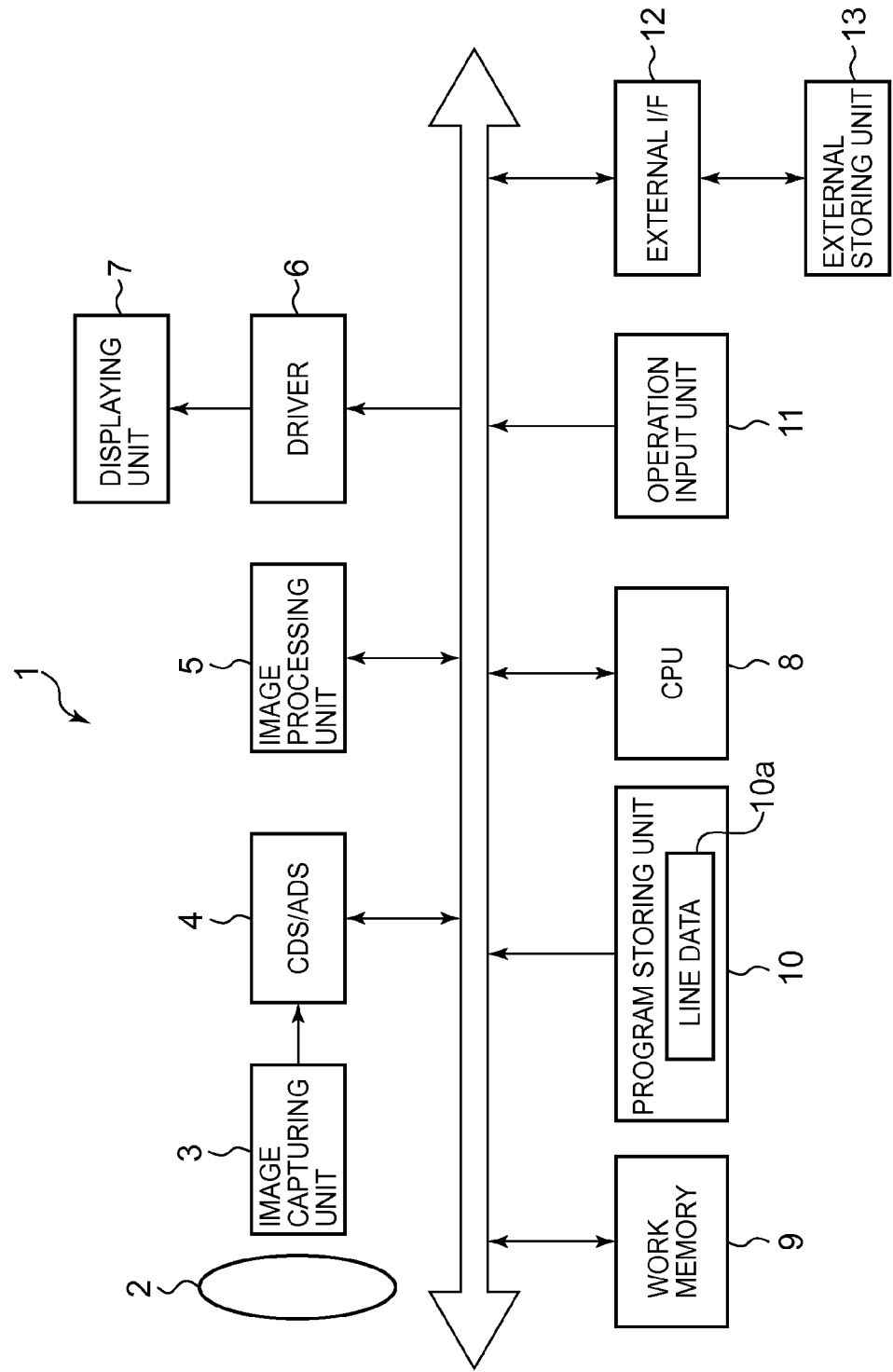

MOVING IMAGE REPRODUCING APPARATUS CAPABLE OF ADJUSTING DISPLAY POSITION OF INDICATOR FOR MOTION ANALYSIS BASED ON DISPLACEMENT INFORMATION OF FRAMES, AND MOVING IMAGE REPRODUCING METHOD AND RECORDING MEDIUM FOR SAME

BACKGROUND OF THE INVENTION

1. Field of the Invention

The present invention relates to a moving image reproducing apparatus and a moving image reproducing method, which can reproduce a previously recorded moving image for the purpose of analyzing a specific motion, and to recording medium storing a program used for the same purpose.

2. Description of the Related Art

Japanese Patent No. Hei10-201898 (1998-201891) discloses an image capturing/reproducing apparatus, which displays reference lines on a moving image in an overlapping manner, when reproducing the moving image, that is obtained by capturing a golfer image, which swings a golf club, wherein the reference lines are used as a guide-indicator for analyzing a golf-club swinging form. In the image capturing/reproducing apparatus, a user finds and displays a frame of image representing a learner-golfer taking an address position by a frame-by-frame playback operation and manually sets display positions of the reference lines appropriate for analyzing the golf-club swinging form, and then playbacks the moving image to analyze the golf-club swinging form.

But the image capturing/reproducing apparatus disclosed in the above patent document can invite the following drawback in the case that the moving image captured with a hand-held digital camera using no tripod stand is used for analyzing the swinging form.

In the moving image captured with a hand-held digital camera using no tripod stand, the field angle (capturing range) can often change from frame of image to frame of image due to camera shake.

Therefore, in the case of analyzing the golf-club swinging form using the moving image imaged or obtained with the hand-held digital camera using no tripod stand, a positional relationship between the learner-golfer and the reference lines, the display positions of which have been set by the user before reproducing the moving image, can change before starting the golf-club swing motion, resulting in disrupting a precise analyze of the swinging form.

SUMMARY OF THE INVENTION

In consideration of the above drawback involved in the conventional apparatuses, the present invention has been made and has an object to provide a technique that allows users to easily and precisely analyze specific motions of a person even using a moving image imaged with a hand-held digital camera.

According to one aspect of the invention, there is provided a moving-image reproducing apparatus for reproducing a previously-recorded moving image, the moving image being composed of plural frames of image, which apparatus comprises a displaying unit for successively displaying reproduced frames of image, a first display controlling unit for displaying an indicator which is displayed at the displaying unit and is used for analyzing a specific motion of a person, a position setting unit for setting a display position of the indicator in one of the frames of image displayed on the displaying unit in response to position setting operation by a user, a second display controlling unit for displaying on the displaying unit in an overlapping manner the indicator together with each of frames of image to be successively reproduced and displayed, following the frame of image, a displacement-information obtaining unit for obtaining displacement information of a field angle of each of the frames of image reproduced, following the frame of image, and a display-position adjusting unit for adjusting the display position based on the displacement information obtained by the displacement-information obtaining unit.

According to another aspect of the invention, there is provided a moving-image reproducing method in a moving-image reproducing apparatus provided with a displaying unit, the moving image being composed of plural frames of image, which method comprises a first displaying step of displaying an indicator which is displayed at the displaying unit and is used for analyzing a specific motion of a person, a position setting step of setting a display position, at which the indicator is to be displayed, in response to position setting operation by a user, a displaying step of successively reproducing and displaying on the displaying unit frames of image following the frame of image, in which the display position is set at the position setting step with the indicator displayed at the display position set at the position setting step in an overlapping manner, a displacement-information obtaining step of obtaining displacement information of a field angle of each of the frames of image reproduced, following the frame of image, in which the display position is set at the position setting step, and a display-position adjusting step of adjusting the display position of the indicator based on the displacement information obtained at the displacement-information obtaining step.

According to still another aspect of the invention, there is provided a computer readable recording medium to be mounted on a moving image reproducing apparatus for reproducing a previously recorded moving image, the moving image being composed of plural frames of image, wherein the moving image reproducing apparatus is provided with a computer and a displaying unit for displaying a moving image, which recording medium stores a program, when executed by the computer, to make the computer function as a first display controlling unit for displaying an indicator which is displayed at the displaying unit and is used for analyzing a specific motion of a person, a position setting unit for setting a display position in the displayed frame of image in response to position setting operation by a user, a second display controlling unit for displaying on the displaying unit frames of image successively reproduced, following the frame of image, in which the display position is set by the position setting unit, with the indicator displayed in an overlapping manner, a displacement-information obtaining unit for obtaining displacement information of a field angle of each of the frames of image reproduced, following the frame of image, in which the display position has been set by the position setting unit, and a display-position adjusting unit for adjusting the display position of the indicator based on the displacement information obtained by the displacement-information obtaining unit.

BRIEF DESCRIPTION OF THE DRAWINGS

FIG. 1 is a block diagram of a configuration of a digital camera according to an embodiment of the present invention.

DETAILED DESCRIPTION OF THE PREFERRED EMBODIMENTS

Figure 2A:
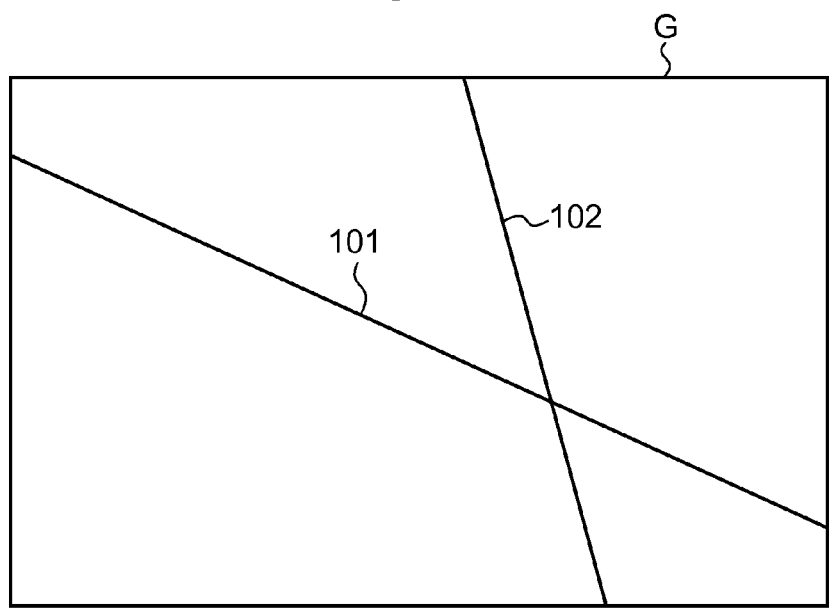
FIG. 2A is a view illustrating a first guide-indicator consisting of a first slant line and a second slant line.

Now, embodiments of the invention will be described with reference to the accompanying drawings. The embodiment of the present invention relates to a digital camera, which is capable of capturing still images and moving images and has a function of a moving image reproducing apparatus of the invention. The digital camera according to the embodiment of the present invention has a function of displaying or indicating a guide-indicator (to be described later in detail) on a moving image in an overlapping manner, when the moving image of a person is reproduced for the purpose of motion analysis, wherein the guide-indicator is two-dimensional information used for analyzing a specific motion of a person.

FIG. 1 is a block diagram of a configuration of the digital camera 1 according to the embodiment of the invention. The digital camera 1 comprises an optical capturing system 2, an image capturing unit 3, CDS/ADC 4, an image processing unit 5, a driver 6, a displaying unit 7, CPU (Central Processing Unit) 8, a work memory 9, a program storing unit 10, operation input unit 11, an external I/F 12, and an external storing unit 13.

The optical capturing system 2 includes zoom lenses and focus lenses, whose positions are properly adjusted by lens motors (not shown) under control of CPU 8.

The image capturing unit 3 comprises a solid-state image capturing device such as CCD (Charge Coupled Device) and/or CMOS (Complementary Metal Oxide Semiconductor). The solid-state image capturing device photo-electrically converts an optical image light-collected by the optical capturing system 2 into an image signal consisting of RGB elements.

CDS/ADC 4 comprises CDS (Correlated Double Sampling) and ADC (Analog-to-Digital Converter). CDS/ADC 4 removes noises from the image signal supplied from the image capturing unit 3, and converts the image signal with noises removed into image data.

The image processing unit 5 has a buffer memory for storing image data sent from CDS/ADC 4. The image processing unit 5 executes a gamma correction on the image data stored in the buffer memory, white-balance adjustment in accordance with a sort of a capturing light source, generation of R, G, B color component data of each pixel, and YUV conversion of converting the generated RGB data into YUV data.

Further, the image processing unit 5 executes a compression/expansion process on image data in accordance with an instruction sent from CPU 8. In capturing operation in a still image mode, the image processing unit 5 compresses and encodes YUV data into image data in conformity with JPEG format. CPU 8 adds predetermined information to the compressed image data, and stores the image data with the information added (still-image file) in the external storing unit 13.

In capturing operation in a moving image mode, the image processing unit 5 compresses and encodes successively-generated YUV data into data in conformity with MPEG format. CPU 8 adds predetermined information to the compressed image data, and stores the compressed data with the information added (moving-image file) in the external storing unit 13.

Further, in a reproducing mode, the image processing unit 5 reads the still image data and/or the moving image data from the external storing unit 13 and decodes the still image data and/or the moving image data under control of CPU 8, and then supplies the decoded data to CPU 8.

The external storing unit 13 is a detachable recording medium of a card type, which is installed into and/or uninstalled from a card slot (not shown) provided in a body (not shown) of the digital camera 1. The external I/F 12 is an input/output interface provided between the external storing unit 13 and CPU 8.

The displaying unit 7 consists, for instance, of a color liquid crystal displaying panel of a TFT type. When driven by the driver 6, the displaying unit 7 displays various images and other information. More specifically, in the still image mode and/or in the moving image mode, the displaying unit 7 displays a through image, that is, an image based on YUV data generated by the image processing unit 5 in a capturing standby state or during capturing operation. Further, in a reproducing mode, the displaying unit 7 displays a still image or a moving image based on YUV data expanded by the image processing unit 5.

The work memory 9 is a volatile memory such as SDRAM (Synchronous Dynamic Random-Access Memory). The program storing unit 10 is ROM (Read Only Memory). The program storing unit 10 stores data and various sorts of programs for CPU 8 to control whole operation of the digital camera 1. CPU 8 runs the program stored in the program storing unit 10 to function as a position setting unit, a first display controlling unit, a second display controlling unit, a displacement information obtaining unit, a position correcting unit, an area setting unit and a judging unit, thereby executing processes to be described later.

Data stored in the program storing unit 10 includes line data 10a to be described below.

The line data 10a is used to define plural subsidiary lines. These subsidiary lines compose the guide-indicator, which CPU 8 displays or indicates on the displaying unit 7 when needed in reproducing a moving image. The guide-indicator displayed or indicated by the digital camera 1 contributes for a user to confirm his or her golf-club swinging form. More specifically, the line data 10a includes data for displaying a first guide-indicator and data for displaying a second guide-indicator, wherein the guide-indicator is used together with a moving image (side moving image) of a learner-golfer "P", which is captured from the side and the second guide-indicator is used together with a moving image (front moving image) of the learner-golfer "P", which is captured from the front.

FIG. 2A is a view illustrating the first guide-indicator. As illustrated in FIG. 2A, the first guide-indicator consists of two subsidiary lines, that is, a first slant line 101 and a second slant line 102. The first line 101 and the second line 102 have different inclination angles to the top and bottom frame-line and to the side frame-lines of a display screen "G" of the displaying unit 7, and intersect one another at a predetermined position.

Figure 2B:
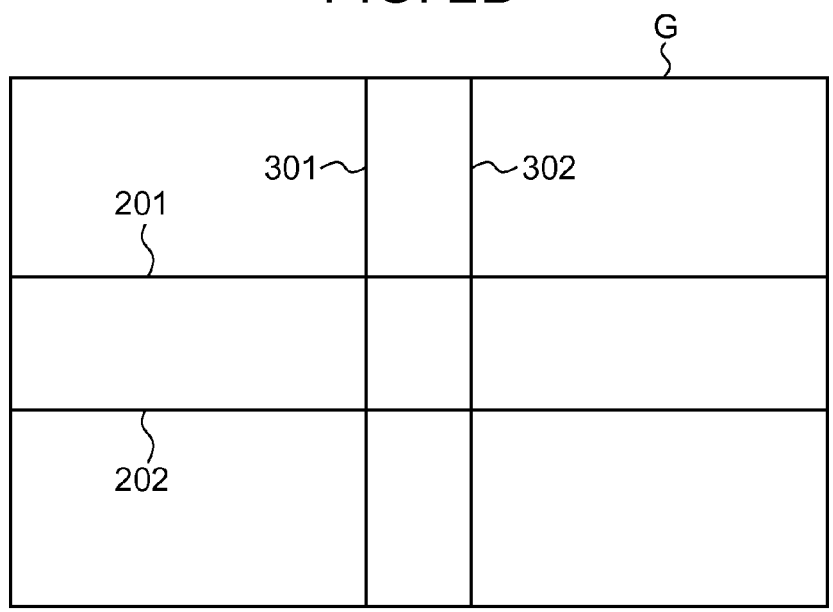
FIG. 2B is a view illustrating a second guide-indicator consisting of a first horizontal line, a second horizontal line, a first vertical line, and a second vertical line.

FIG. 2B is a view illustrating the second guide-indicator. As illustrated in FIG. 2B, the second guide-indicator consists of four subsidiary lines, that is, a first horizontal line 201 and a second horizontal line 202, a first vertical line 301 and a second vertical line 302. The first horizontal line 201 and the second horizontal line 202 run in parallel with the top and bottom frame-line of the display screen "G" of the displaying unit 7. The first vertical line 301 and the second vertical line 302 run in parallel with the side frame-lines of the display screen "G" of the displaying unit 7.

The program storing unit 10 stores the line data 10a, which contains line widths of the subsidiary lines 101, 102 of the first guide-indicator and of the subsidiary lines 201, 202, 301, 302 of the second guide-indicator, initial positions in the display screen "G" where the subsidiary lines are to be displayed at first, and data representing the inclination angles of the first slant line 101 and the second slant line 102 to the frame-line of the display screen "G".

Meanwhile, the operation input unit 11 comprises various sorts of switches, including a shutter button key, a zoom key, a mode setting key, an orientation key and a set key, wherein the zoom key is used to set a zoom factor, the mode setting key is used to set an operation mode (still image mode, moving image mode and reproducing mode), and the orientation key is used to indicate an upward, downward, leftward and/or rightward direction.

The orientation key and set key are used to operate a menu-indication displayed on the displaying unit 7, thereby setting operation of the digital camera 1 and further setting plural sorts of operation modes in the fundamental operation mode. Meanwhile, the orientation key and set key are used to adjust display positions in the display screen "G" where the subsidiary lines of the first and second guide-indicator are to be displayed.

Figure 3:
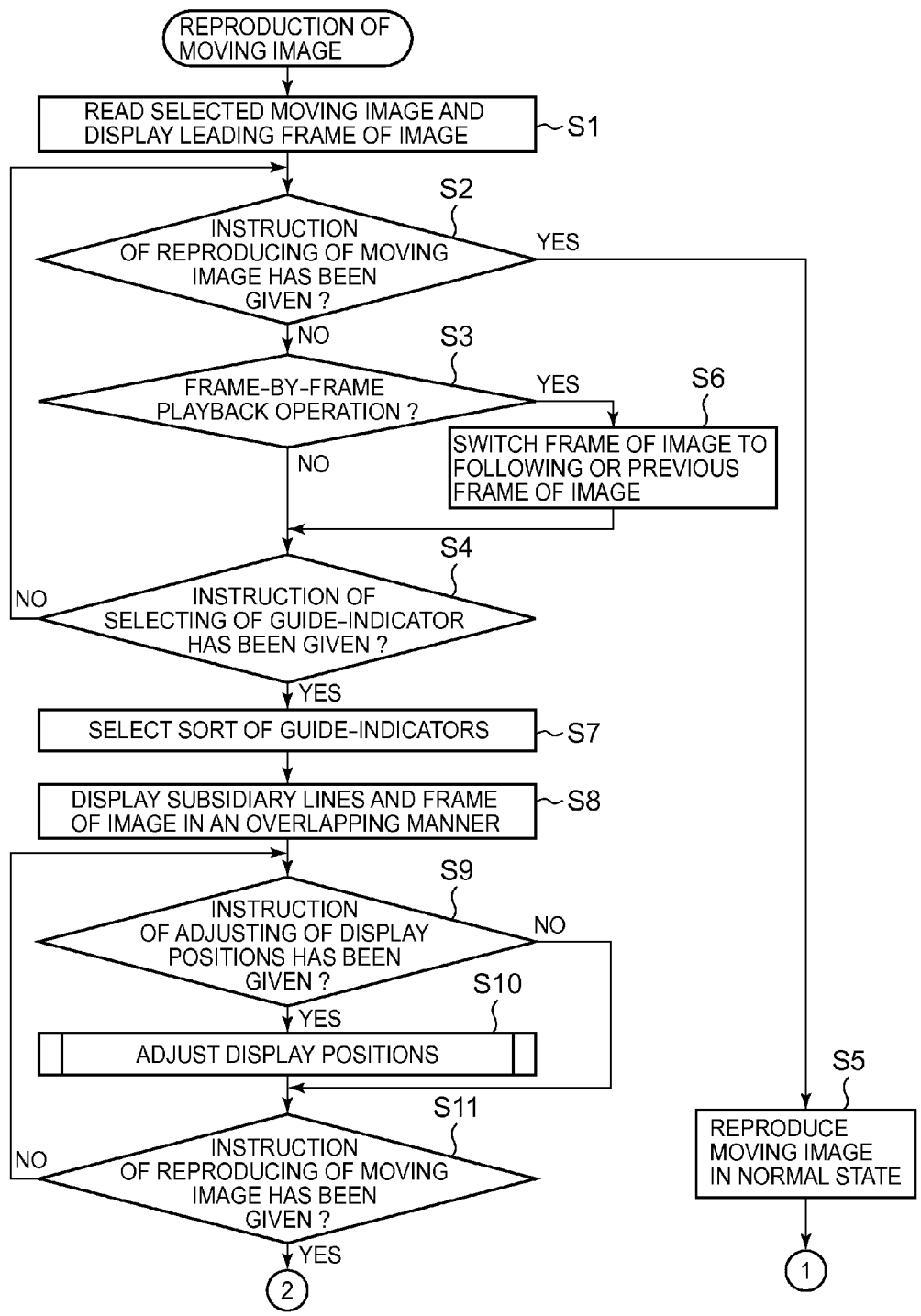
FIGS. 3 and 4 are flow charts of a process of reproducing a moving image.
Figure 4:
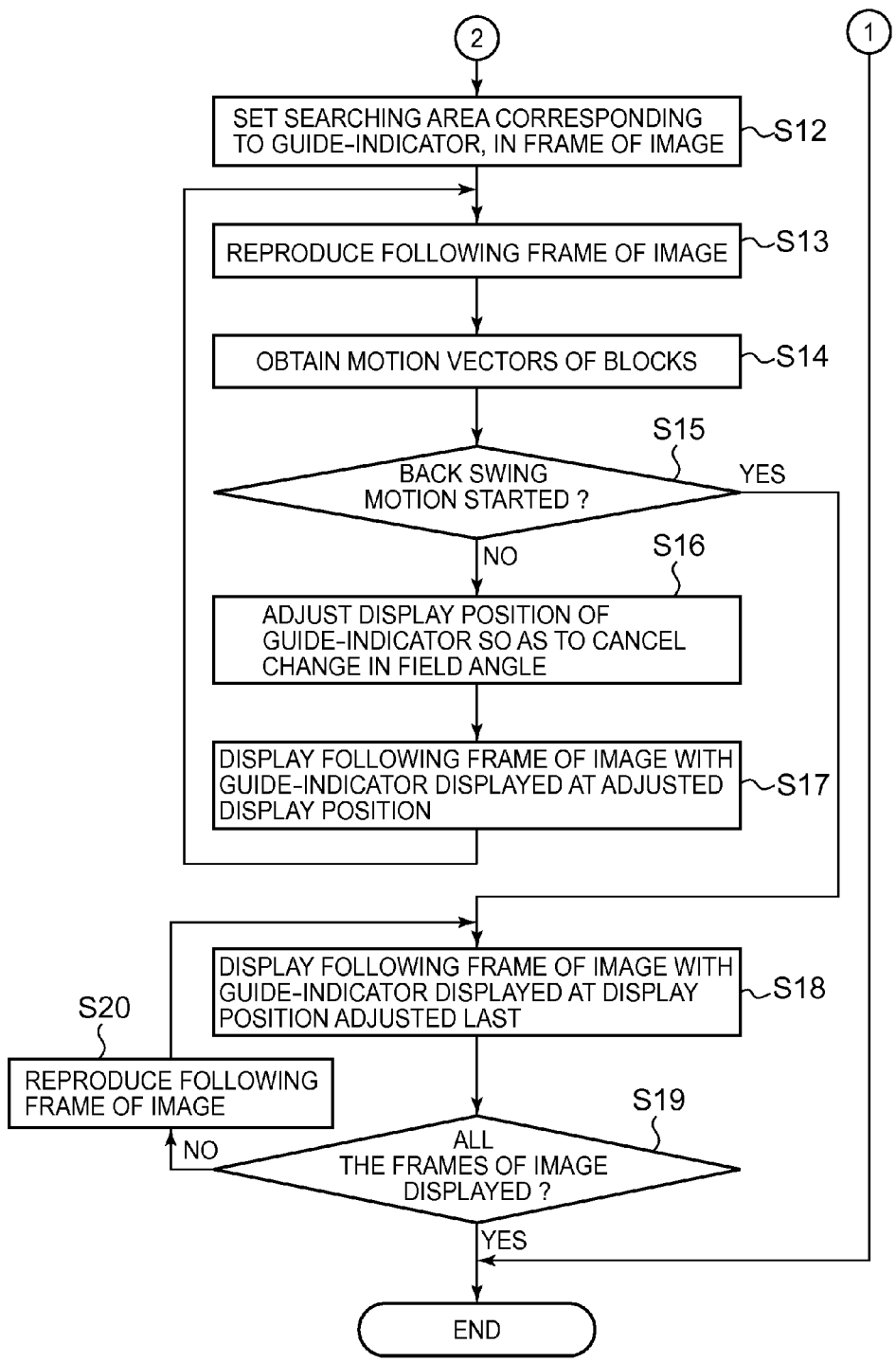

Now, operation of the digital cameras 1 will be described in accordance with flow charts shown in FIGS. 3 to 5. FIGS. 3 and 4 are flow charts of a moving image reproducing process, which is to be performed by CPU 8, when the user selects a moving image stored in the external storing unit 13, after setting the reproducing mode by operating the mode setting button. In the following description, it is assumed that the user has selected a moving image (side moving image or front moving image), which is obtained by capturing a learner-golfer image. The learner-golfer swings a golf club.

When the moving image has been selected by the user, CPU 8 reads data of the selected moving image from the external storing unit 13, and then makes the image processing unit 5 perform an expansion process on the image data read from the external storing unit 13, reproducing and displaying a leading frame of image on the displaying unit 7 at step S1.

Further, CPU 8 detects operated state of the switches included in the operation input unit 11 with the leading frame of image displayed on the displaying unit 7. CPU 8 judges at step S2 whether or not an instruction of reproducing the moving image has been given by the user, judges at step S3 whether or not an instruction of performing a frame-by-frame playback operation or a frame-by-frame rewind operation has been given, and further judges at step S4 whether or not an instruction of selecting the guide-indicator has been given.

When it is determined at step S2 that the user has operated the appropriate switch in the operation input unit 11 to give an instruction of reproducing the moving image (YES at step S2), CPU 8 reproduces in a normal state the moving image, the leading frame of image of which is displayed on the displaying unit 7 (step S5). In other words, CPU 8 makes the image processing unit 5 execute the expanding process on the moving image data read from the external storing unit 13 (step S1) to display the moving image on the displaying unit 7 (Refer to FIG. 4).

When it is determined at step S3 that the user has operated the appropriate switch in the operation input unit 11 to give an instruction of performing a frame-by-frame playback operation or a frame-by-frame rewind operation (YES at step S3), CPU 8 switches the image displayed on the displaying unit 7 to the following frame of image or the previous frame of image in response to user's operation (step S6). At this time, the user manually selects a frame of image representing the learner-golfer "P" who is in an address and displays the selected frame of image on the displaying unit 7. Although not shown in the drawings, with the leading frame of image displayed on the displaying unit 7 at the beginning of the process, CPU 8 executes the process of step S6 only in the case that the frame-by-frame playback operation has been detected.

When it is determined at step S4 that an instruction of selecting the guide-indicator has been given (YES at step S4), the user is allowed to operate the switch in the operation input unit 11 to choose the sort of guide-indicator (step S7). In other words, in the case that the side moving image has been chosen to be displayed, CPU 8 allows the user to choose the first guide-indicator shown in FIG. 2A. Meanwhile, in the case that the front moving image has been chosen to be displayed, CPU 8 allows the user to choose the second guide-indicator shown in FIG. 2B.

Thereafter, CPU 8 reads from the program storing unit the subsidiary lines of line data 10a composing the guide-indicator (first guide-indicator or second guide-indicator) chosen by the user, and displays the subsidiary lines together with an arbitrary frame of image on the displaying unit 7 in an overlapping manner (step S8). The frame of image displayed at this time is used for setting display positions of the guide-indicator.

Figure 6A:
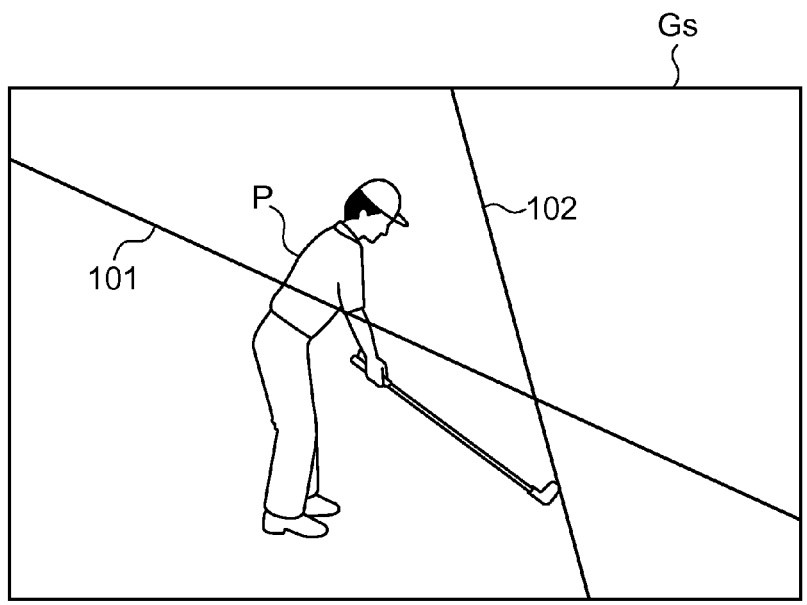
FIGS. 6A, 6B, 7A and 7B are views showing the first guide-indicator and a learner-golfer displayed on a displaying unit in an overlapping manner.

FIG. 6A is a view showing an example of a display image displayed on the displaying unit 7 when the side moving image is set as a moving image to be displayed and the first guide-indicator is chosen by the user. In this case, two subsidiary lines (first slant line and second slant line) 101, 102 are displayed in an overlapping manner on an image Gs, which is processed and previously displayed on the displaying unit 7 at step S1 or at step S6. The first slant line 101 and second slant line 102 are displayed at the initial positions as shown in FIG. 2A, respectively.

Figure 8A:
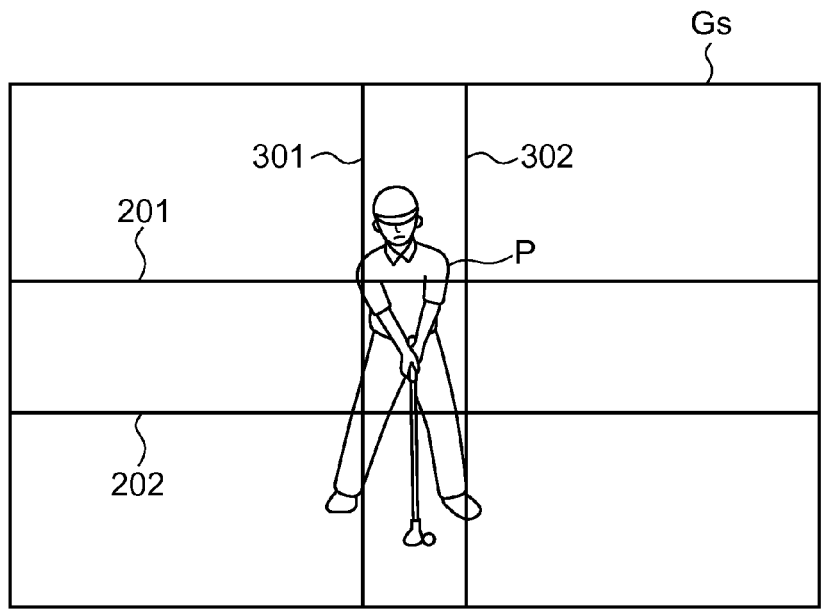
FIGS. 8A, 8B, 9A, 9B, and 10 are views showing the second guide-indicator and the learner-golfer displayed on the displaying unit in an overlapping manner.

FIG. 8A is a view showing an example of a display image displayed on the displaying unit 7 when the front moving image is set as a moving image to be displayed and the second guide-indicator is chosen by the user. In this case, four subsidiary lines (first horizontal line and second horizontal line, first vertical line and second vertical line) 201, 202, 301 and 302 are displayed in an overlapping manner on the image Gs, which is processed and previously displayed on the displaying unit 7 at step S1 or at step S6. The subsidiary lines 201, 202, 301 and 302 are displayed at the initial positions as shown in FIG. 2B, respectively.

Then, the user is allowed to operate the key to adjust the display positions where the subsidiary lines are displayed or to give an instruction of reproducing a moving image. When an instruction of adjusting the display positions of the subsidiary lines (YES at step S9), CPU 8 adjusts the display positions of the subsidiary lines at step S10 (Refer to FIG. 5).

Figure 5:
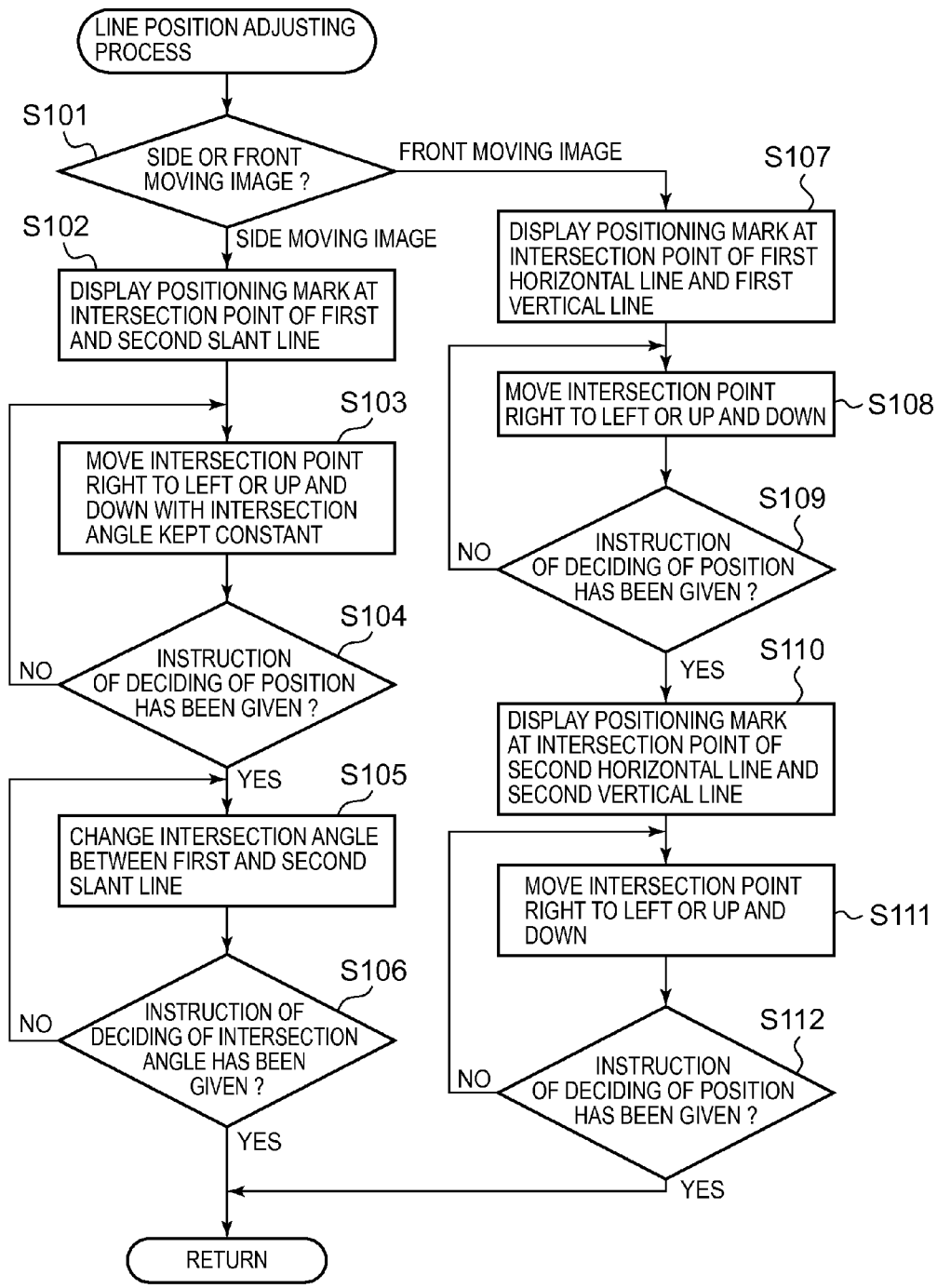
FIG. 5 is a flow chart of a process of adjusting subsidiary-line positions.
Figure 6B:
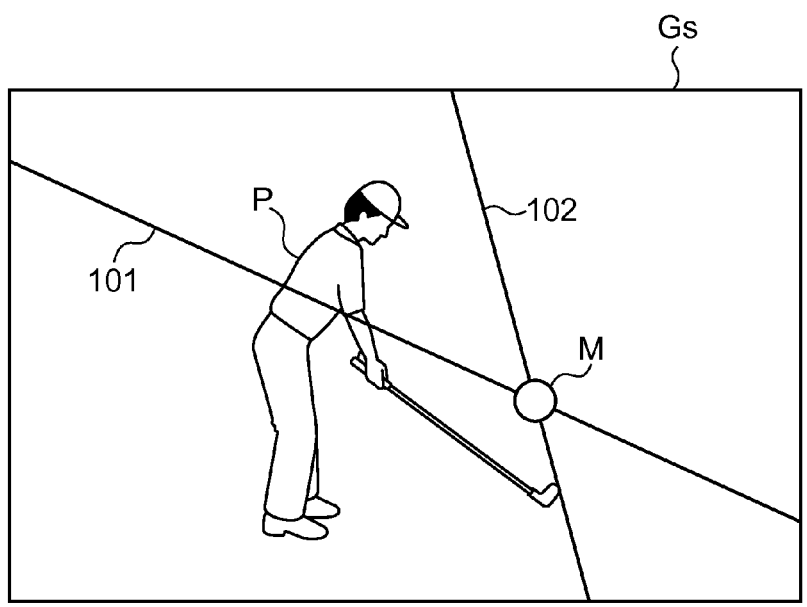

FIG. 5 is a flow chart of a subsidiary-line position adjusting process to be performed in the present embodiment. When it is determined at step S101 that a moving image to be displayed is the side moving image, CPU 8 displays a round positioning mark "M" at the position of the intersection point of the first slant line 101 and the second slant line 102 as shown in FIG. 6B (step S102), wherein the first slant line 101 and the second slant line 102 are displayed on the leading frame of image Gs in an overlapping manner.

Then, CPU 8 repeatedly moves the positioning mark "M" in response to user's key operation until the user operates the key to give an instruction of deciding the position of the positioning mark "M" (NO at step S104). In other words, CPU 8 repeatedly moves the position of the intersection point of the first slant line 101 and the second slant line 102 from right to left or up and down in the display screen "G" of the display unit 7 with the intersection angle between the first slant line 101 and the second slant line 102 kept constant (step S103).

Figure 7A:
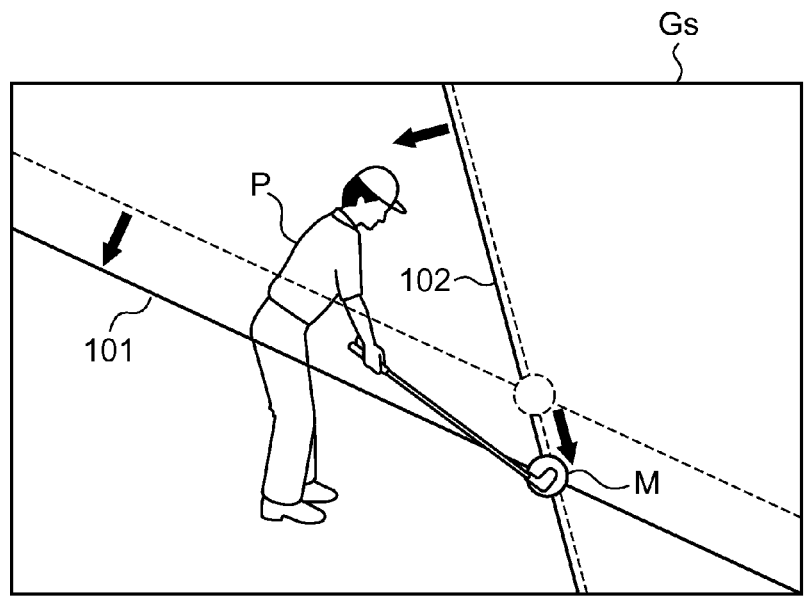

Meanwhile, the user moves or brings the positioning mark "M" (the intersection point of the first slant line 101 and the second slant line 102) to a position of a club head such that the positioning mark "M" laps over the club head as shown in FIG. 7A.

When an instruction of deciding the position of the positioning mark "M" is given by the user (YES at step S104), in response to user's key operation CPU 8 repeatedly changes the intersection angle between the first slant line 101 and the second slant line 102 with the position of the intersection point of the first slant line 101 and the second slant line 102 fixed at a certain position (step S105) until the user operates the key to give an instruction of deciding the intersection angle (NO at step S106).

Figure 7B:
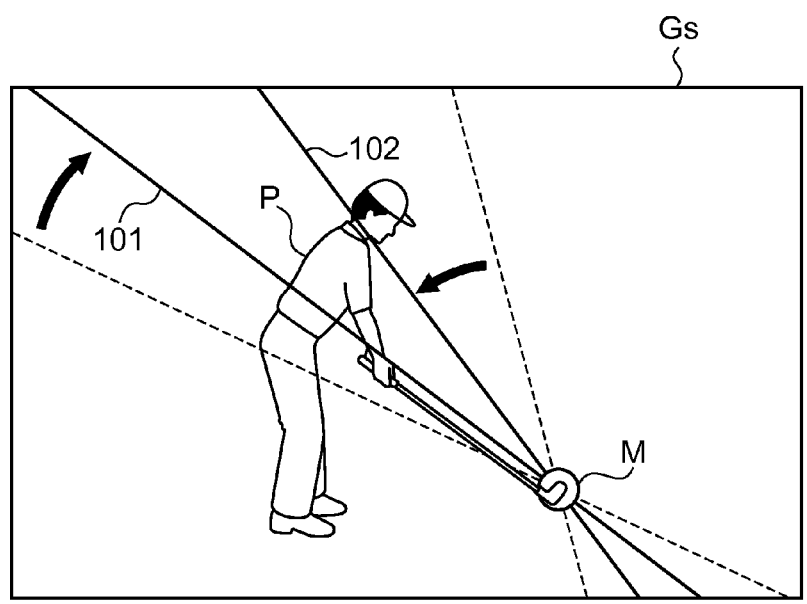

The user adjusts the inclination angle of the first slant line 101 and the slant angle of the second slant line 102 such that the first slant line 101 is brought to run substantially in parallel with a golf shaft and the second slant line 102 is brought to run through the neck of the learner-golfer "P", as shown in FIG. 7B. At the time when an instruction of deciding the intersection angle has been given by the user (YES at step S106), CPU 8 finishes the subsidiary-line position adjusting process and returns to the main flow (FIG. 3).

Figure 8B:
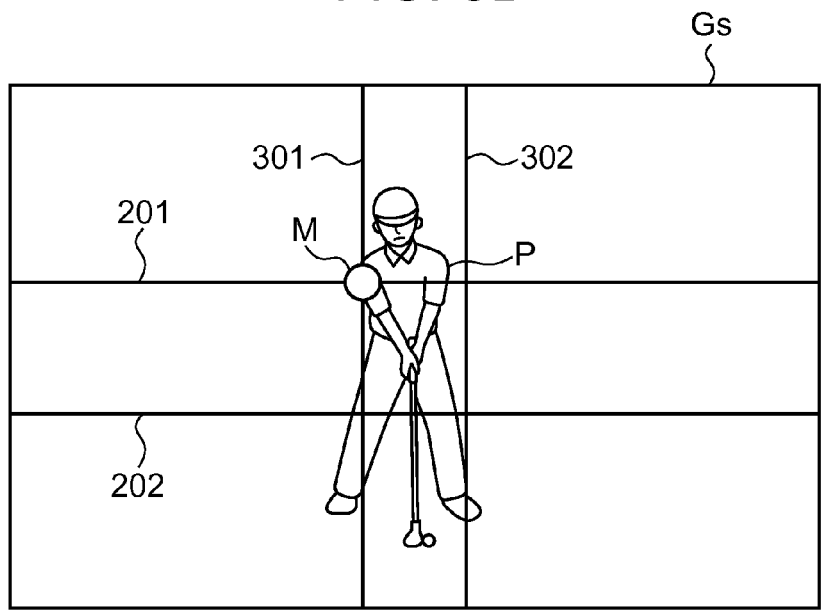

In the subsidiary-line position adjusting process, when the front moving image is set as a moving image to be displayed (step S101), CPU 8 displays the round positioning mark "M" at the position of the intersection point of the first horizontal line 201 and the first vertical line 301 as shown in FIG. 8B (step S107), wherein the first horizontal line 201 and the first vertical line 301 are displayed on the leading frame of image Gs in an overlapping manner.

Then, CPU 8 repeatedly moves the positioning mark "M" (intersection point of the first horizontal line 201 and the first vertical line 301) from right to left or up and down in the display screen "G" of the display unit 7 in response to user's key operation (step S108) until the user gives an instruction of deciding the position of the positioning mark "M" (NO at step S109).

Figure 9A:
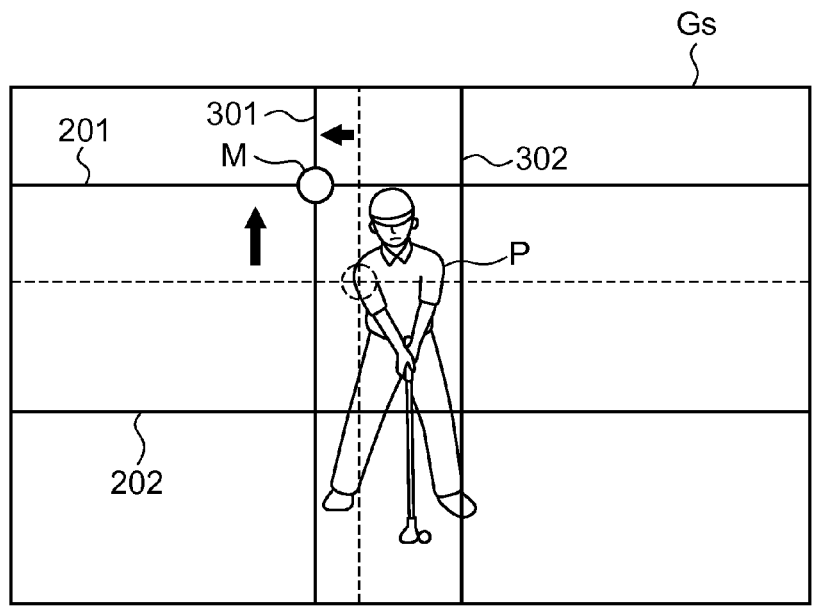

Meanwhile, the user moves or adjusts the position of the positioning mark "M" (the intersection point of the first horizontal line 201 and the first vertical line 301) such that the first horizontal line 201 will meet the top of the head of the learner-golfer "P" and the first vertical line 301 will meet the outside of the right foot of the learner-golfer "P" as shown in FIG. 9A.

Figure 9B:
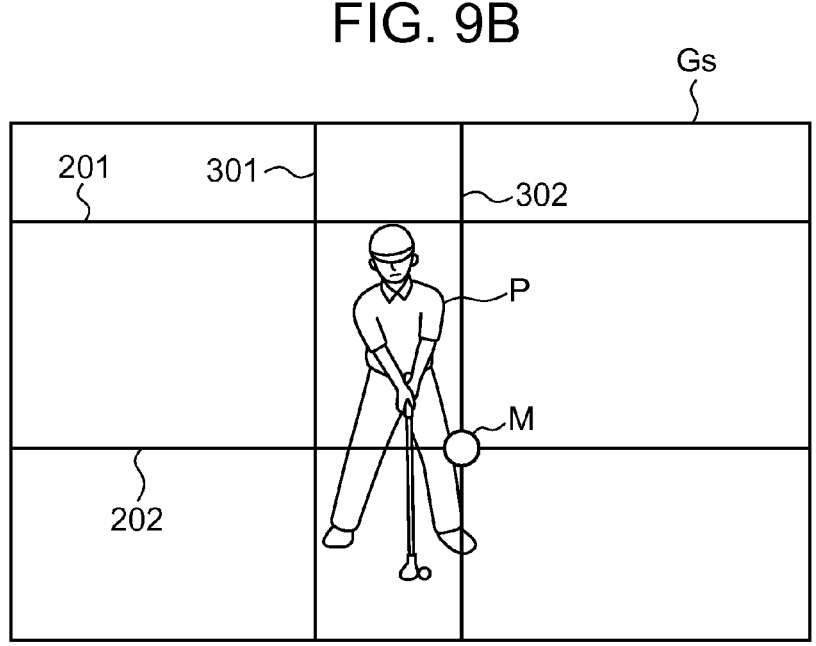

Further, CPU 8 displays the round positioning mark "M" at the position of the intersection point of the second horizontal line 202 and the second vertical line 302 as shown in FIG. 9B (step S110), wherein the second horizontal line 202 and the second vertical line 302 are displayed on the leading frame of image Gs in an overlapping manner.

Then, CPU 8 repeatedly moves the positioning mark "M" (intersection point of the second horizontal line 202 and the second vertical line 302) from right to left or up and down in the display screen "G" of the display unit 7 in response to user's key operation (step S111) until the user operates the key to give an instruction of deciding the position of the positioning mark "M" (NO at step S112).

Figure 10:
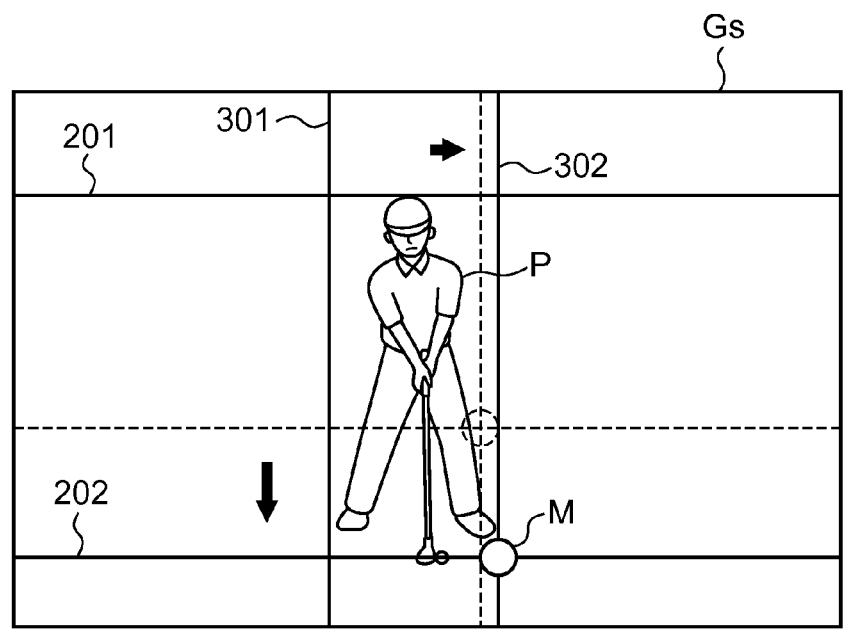

Meanwhile, the user operates the key to adjust the position of the positioning mark "M" such that the second horizontal line 202 will meet the position of a golf ball and the second vertical line 302 will meet the outside of the left foot of the learner-golfer "P" as shown in FIG. 10. At the time when an instruction of deciding the position of the positioning mark "M" has been given by the user (YES at step S112), CPU 8 finishes the subsidiary-line position adjusting process and returns to the main flow (FIG. 3).

When an instruction of reproducing a moving image has been given by the user (NO at step S9 and YES at step S11), CPU 8 executes the process in accordance with the flow chart of FIG. 4 to successively displays remaining frames of image on the displaying unit 7 at a predetermined frame rate.

CPU 8 sets a searching area or an area specified for the guide-indicator selected by the user in the display image (position setting image) displayed on the displaying unit 7 (step S12).

Figure 11A:
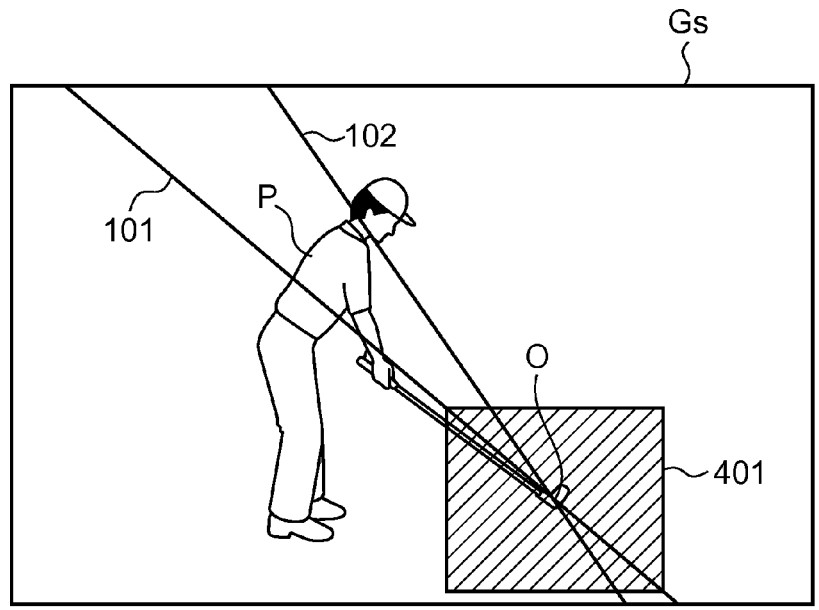
FIG. 11A is a view showing a searching area specified for the first guide-indicator.

FIG. 11A is a view showing the searching area 401 specified for the first guide-indicator and set in the display image Gs by CPU 8 in the case the side moving image is set as the display image to be displayed (step S12). The searching area 401 for the first guide-indicator is an area in which the first slant line 101 and the second slant line 102 composing the first guide-indicator are used as the reference. The searching area 401 is a square area, which has its center at the intersection point "O" of the first slant line 101 and the second slant line 102. The size and the horizontal to vertical ratio of the searching area 401 are previously determined. The head of the golf club is included within the searching area 401 of the display image Gs.

Figure 11B:
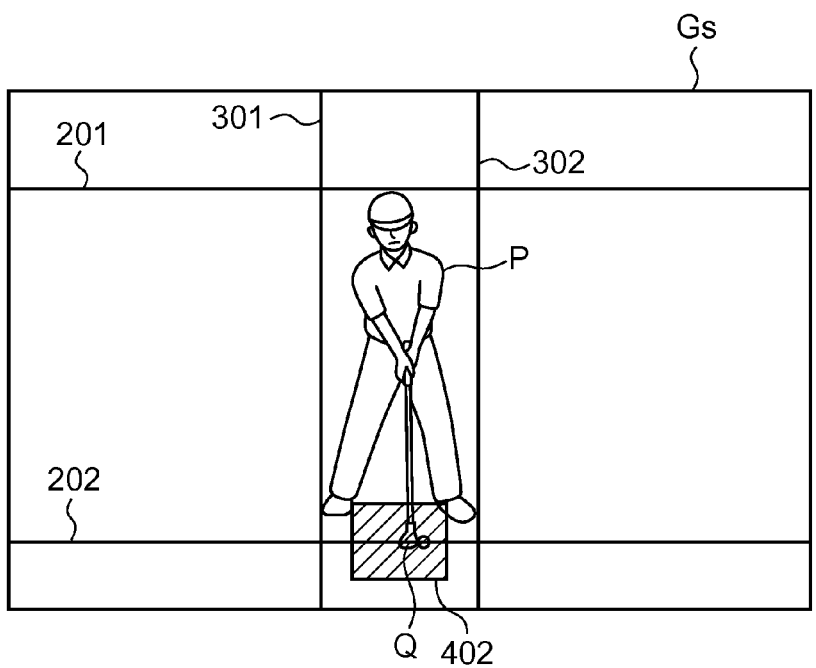
FIG. 11B is a view showing a searching area specified for the second guide-indicator.

FIG. 11B is a view showing a searching area 402 specified for the second guide-indicator and set in the display image Gs by CPU 8 in the case the front moving image is set as the display image to be displayed (step S12). The searching area 402 for the second guide-indicator is an area in which the second horizontal line 202, the first vertical line 301 and the second vertical line 302 composing the second guide-indicator are used as the reference. The searching area 402 is a square area, which has its center "Q" at the center of a line segment of the second horizontal line 202 defined by the first vertical line 301 and the second vertical line 302. The horizontal to vertical ratio of the searching area 402 is previously determined. But the size of the searching area 402 is proportional to the line segment between the first vertical line 301 and the second vertical line 302. The width of the searching area 402 corresponds to "n" percent (previously determined ratio) of the line segment. As shown in FIG. 11B, the searching area 402 of the display image Gs contains the head of the golf club like the searching area 401 shown in FIG. 11A. Both the searching areas include an object, motion of which is to be analyzed.

CPU 8 makes the image processing unit 5 reproduce a frame of image following the frame of image currently displayed on the displaying unit 7 (step S13) and then divides the searching areas 401, 402 into plural macro blocks. With respect to all the divided blocks, CPU 8 obtains motion vectors each of which represents a relative discrepancy amount and a discrepancy direction of an object part falling into a block, appearing between the adjacent frames of image (step S14). To obtain the motion vectors, a well-known method such as Block-Matching Method for estimating motion of an object on a block-by-block basis may be used. The obtained motion vector of each block is used as displacement-information in the present invention, which displacement-information represents a displacement in a field angle between the adjacent frames of image.

Further, using the motion vectors obtained with respect to the divided blocks, CPU 8 judges at step S15 whether or not the learner-golfer "P" has started a back-swing motion, in other words, CPU 8 judges depending on the method stated below, whether or not the following frame of image corresponds to the starting time of the back-swing motion (specific motion).

As described above, the head of the golf club remains in the searching areas (401, 402) set in the process at step S12. In a capturing operation, even if a field angle should change due to camera shake during a period from one frame of image to the following frame of image, all the motion vectors of the divided blocks will remain substantially the same as far as the head of the golf club is kept still. On the other hand, when the head of the golf club is moved after the start of the back-swing motion, the motion vectors of the blocks corresponding to the head of the golf club will be different from the motion vectors of the blocks other than the above blocks. Based on the above basis, CPU 8 judges whether or not the learner-golfer has started the back-swing motion.

More specifically, in accordance with a predetermined standard, CPU 8 groups the motion vectors of the divided blocks into plural groups on the condition that the motion vector represents a close discrepancy amount and a close discrepancy direction. If the motion vectors of the blocks cannot be grouped into plural groups, CPU 8 determines that the learner-golfer has not yet started the back-swing motion.

When the motion vectors of the blocks are grouped into plural groups, CPU 8 calculates an average (first average discrepancy amount) of the discrepancy amounts of the first group, an average (first average discrepancy direction) of the discrepancy directions of the first group, an average (second average discrepancy amount) of the discrepancy amounts of the second group, and an average (second average discrepancy direction) of the discrepancy directions of the second group, wherein the first group includes the largest number of motion vectors of the blocks and the second group includes the second largest number of motion vectors of the blocks. Either one of the first group and the second group consists of the motion vectors of the blocks, which contain the head of the golf club, and the other group consists of the motion vectors of the blocks, which contain a background of the head of the golf club.

If a difference between the first average discrepancy amount and the second average discrepancy amount and/or a difference between the first average discrepancy direction and the second average discrepancy direction is equal to a threshold value or less, CPU 8 determines that the "back-swing motion has not yet started" (step S15). On the other hand, if a difference between the first average discrepancy amount and the second average discrepancy amount and/or a difference between the first average discrepancy direction and the second average discrepancy direction is larger than the threshold value, CPU 8 determines that the "back-swing motion has started" (step S15).

When it is determined at step S15 that the "back-swing motion has not yet started" (NO at step S15), CPU 8 adjusts a display position where the guide-indicator is currently displayed or indicated to the position such that the change in the field angle appeared between the adjacent frames of image is cancelled, based on the motion vectors of the blocks.

When the motion vectors of the blocks cannot be grouped into plural groups, CPU 8 calculates an averages of the discrepancy amounts and an average of the discrepancy directions of all the motion vectors of the blocks (step S16). Then, CPU 8 moves in the display screen "G" the currently displayed guide-indicator by the calculated average of the discrepancy amounts in the direction opposite to the calculated average of the discrepancy directions. In this case, all the motion vectors of the blocks are used as displacement information in the present embodiment of the invention.

When the motion vectors of the blocks can be grouped into plural groups, CPU 8 moves in the display screen "G" the currently displayed guide-indicator by the average (first average discrepancy amount) of the discrepancy amounts of the motion vectors belonging to the first group in the direction opposite to the average (first average discrepancy direction) of the discrepancy directions of the motion vectors belonging to the first group. In this case, only the motion vectors of the blocks belonging to the first group are used as displacement information in the present embodiment of the invention. The guide-indicator is moved using the first average discrepancy amount and the first average discrepancy direction of the first group, because of the condition that the sizes of the searching areas (401, 402) are at least more than two times of the size of the head of the golf club.

Thereafter, CPU 8 displays the following frame of image with the guide-indicator displayed at the adjusted display position on the displaying unit 7 in an overlapping manner (step S17), and returns to the process at step S13. Then, CPU 8 repeatedly executes the processes at step 13 to step 17.

When it is determined at step S15 that a back-swing motion has started after reproduction of either one of frame of image, CPU 8 displays on the displaying unit 7 in an overlapping manner the following frame of image with the guide-indicator displayed at the last adjusted display position, that is, at the display position adjusted in the process last executed at step S16 (step S18).

Thereafter, until all the frames of image have been displayed (NO at step S19), CPU 8 successively reproduces the following frame of image (step S20) and displays the newly-reproduced frame of image with the guide-indicator displayed at the last adjusted display position on the displaying unit 7 in an overlapping manner (step S18). When all the frames of image have been displayed, CPU 8 finishes the moving image reproducing process.

As described above, when the moving image of the learner-golfer is reproduced, the user can display the guide-indicator (first guide-indicator or second guide-indicator) corresponding to the sort of the moving image (side moving image or front moving image), whereby he or she can enjoy easy analyzing of his or her golf-club swinging form.

In the digital camera 1 according to the embodiment of the invention, when the moving image is reproduced and displayed with the guide-indicator indicated at the display position on the displaying unit 7 in an overlapping manner, such display position of the guide-indicator is adjusted every frame of image such that the change in the field angle caused between the adjacent frames of image will be cancelled until the learner-golfer starts the back-swing motion. Therefore, in a period before the leaner-golfer starts the back-swing motion, the display position of the guide-indicator is kept at a position set by the user appropriate for analyzing a golf-club swinging form.

As described above, when setting the display position of the guide-indicator before reproducing the moving image, the user is not required to repeatedly perform a frame-by-frame playback operation or a frame-by-frame rewind operation of the moving image to find and display a specific frame of image of the learner-golfer, which has been captured just before he or she starts the swing-back motion. In other words, simply displaying a frame of image representing the learner-golfer taking the address position and setting the display position of the guide-indicator in the displayed frame of image, the user can precisely analyze the golf-club swinging form. Further, without previously performing an editing process to set the leading frame of image to the frame of image representing the learner-golfer taking the address position before reproducing the moving image for analyzing the golf-club swinging form, the user can precisely analyze the golf-club swinging form.

Therefore, in the digital camera 1 according to the embodiment of the invention, even when the moving image captured with a hand-held camera is reproduced or the moving image is reproduced, in which the field angle is changed every frame of image due to camera shake, the user can easily and precisely analyze the golf-club swing form.

Further, in the moving image reproducing apparatus according to the embodiment of the present invention, the display position of the guide-indicator is adjusted to the position, which will cancel the change in the field angle from the just previous frame of image, every frame of image only during a frame period before the learner-golfer starts the back-swing motion (specific motion) and after the learner-golfer takes the address position, wherein the frame period is longer than a time during which the learner-golfer is swinging the golf club. Therefore, it is possible to decrease the work load to be processed by CPU 8 in the reproducing operation of the moving image after the starting of the back-swing motion.

A modification may be made to the embodiment of the invention, that adjusts the display position of the guide-indicator every frame of image during the whole period of reproducing operation of the moving image. The modification allows the user to easily and precisely analyze the golf-club swinging form even though a moving image captured with a hand-held camera is reproduced.

In the embodiment of the invention, the searching areas (401, 402) corresponding to the guide-indicator set in response to the user's operation are set with respect to every frame of image following the image, in which the display position of the guide-indicator is set, and motion vectors of the set searching areas to be processes are obtained. Therefore, the displacement information required for adjusting the display position of the guide-indicator can be effectively and precisely obtained.

Another modification may be made to the embodiment of the invention, in which motion vectors are obtained, for example, from the whole area of each frame of image, and/or from a predetermined specific fixed area or an area to be processed, not from the searching area corresponding to the display position of the guide-indicator set in response to the user's operation.

In the embodiment of the invention, the motion vectors of the blocks set in the searching area(s) (401, 402) are used as displacement information of the present invention and are successively obtained from the moving image while the same is being displayed. But a still another modification may be made to the embodiment of the invention, in which the motion vectors of the blocks are previously obtained in one lump with respect to each of the frames of image, for instance, just before the starting of displaying the moving image after setting the display position of the guide-indicator.

In the embodiment of the invention, the searching area(s) (401, 402) corresponding to the sort of the guide-indicators is set as an area to be processed and the motion vectors of the blocks are used as the displacement information of the present invention. But information other than the motion vectors of the blocks can be employed as the displacement information of the invention. For instance, in the case a digital camera is used, equipped with a sensor such as an acceleration sensor for detecting camera shake when capturing pictures, a detection signal output from the sensor can be used as the displacement information of the invention.

The embodiment of the invention has been described, in which the guide-indicator to be displayed together with the moving image in an overlapping manner consists of plural subsidiary lines, but the guide-indicator to be displayed on the moving image in an overlapping manner may consist of one single subsidiary line. In the case the guide-indicator consists of one single subsidiary line or plural subsidiary lines, any figure of the subsidiary line(s) may be employed, that is, the subsidiary line(s) is not limited to a straight line but may be a curve line and/or a broken or dotted line.

The guide-indicator to be displayed together with the moving image in an overlapping manner may be any information as far as it can be displayed on the moving image in an overlapping manner, that is, the guide-indicator is not always a line image but two dimensional information, and the guide-indicator can be changed to any arbitrary two dimensional information.

The embodiment of the invention has been described, in which the guide-indicator to be displayed together with the moving image in an overlapping manner is used for analyzing the golf-club swinging motion. But the guide-indicator to be displayed on the moving image in an overlapping manner will be any indication which is used for analyzing a predetermined specific motion. For instance, as the guide-indicator may be used an indication which is used for analyzing pitching form and/or batting form in baseball. In this case, the guide-indicator to be displayed on the moving image in an overlapping manner is altered to be appropriate for analyzing such specific motions.

In the above description, the present invention has been described, which is applied to the digital camera having a function of capturing a moving image. But the present invention can be applied to any apparatuses other than the digital camera, which apparatuses have a function of reproducing a previously recorded moving image, such as personal computers and mobile phones having no function of capturing a moving image, and digital photo-frame apparatuses used for displaying pictures captured with a digital camera.

What is claimed is:

1. A moving-image reproducing apparatus comprising:
a CPU and a memory having instructions stored therein which are executable by the CPU to cause the CPU to perform functions including:
  setting a first position of an indicator in one of a plurality of frames of a moving image which is displayed on a display, wherein the indicator is used for analyzing a specific motion of an object in the moving image;
  judging whether or not the specific motion of the object has started after the first position of the indicator is set in the one of the frames;
  obtaining displacement information of a positional change between photographing ranges of the frames of the moving image following the one of the frames in which the first position of the indicator has been set and before it is determined that the specific motion has started; and adjusting, without considering the specific motion of the object, the first position of the indicator to a second position in the moving image such that a positional change from the first position to the second position matches the positional change corresponding to the obtained displacement information.

2. The moving-image reproducing apparatus according to claim 1, wherein the memory has further instructions stored therein which are executable by the CPU to cause the CPU to perform functions including:
   setting a specific area corresponding to the set first position of the indicator in each of the photographing ranges,
   wherein the CPU obtains displacement information of the positional change between the specific areas in the photographing ranges.

3. The moving-image reproducing apparatus according to claim 1, wherein the CPU repeatedly adjusts a position of the indicator to a position that will cancel an effect of positional change between photographing ranges of the frames from the one of the frames to a frame in which it is determined that the object starts the specific motion.

4. The moving-image reproducing apparatus according to claim 2, wherein the indicator comprises at least one subsidiary line.

5. The moving-image reproducing apparatus according to claim 4, wherein the CPU sets the specific area in each of the photographing ranges by setting the at least one subsidiary line.

6. The moving-image reproducing apparatus according to claim 1, wherein the indicator comprises at least one subsidiary line.

7. The moving-image reproducing apparatus according to claim 6, wherein the CPU sets a specific area in each of the photographing ranges by setting the at least one subsidiary line.

8. The moving-image reproducing apparatus according to claim 2, wherein the memory has stored therein further instructions that are executable by the CPU to cause the CPU to perform functions including:
   selecting a specific kind of indicator from among plural kinds of indicators,
   wherein the CPU sets the specific area corresponding to the specific kind of indicator selected from among the plural kinds of indicators.

9. A moving-image reproducing method in a moving-image reproducing apparatus the method comprising:
   setting a first position of an indicator in one of a plurality of frames of a moving image which is displayed on a display, wherein the indicator is used for analyzing a specific motion of an object in the moving image;
   judging whether or not the specific motion of the object has started after the first position of the indicator is set in the one of the frames;
   obtaining displacement information of a positional change between photographing ranges of the frames of the moving image following the one of the frames in which the first position of the indicator is set and before it is determined that the specific motion has started; and
   adjusting, without considering the specific motion of the object, the first position of the indicator to a second position in the moving image such that a positional change from the first position to the second position matches the positional change corresponding to the obtained displacement information.

10. A non-transitory computer readable recording medium having stored thereon a program that is executable by a computer of a moving image reproducing apparatus, the program being executable by the computer to make the computer perform functions comprising:
   setting a first position of an indicator in one of a plurality of frames of a moving image which is displayed on a display, wherein the indicator is used for analyzing a specific motion of an object in the moving image;
   judging whether or not the specific motion of the object has started after the first position of the indicator is set in the one of the frames;
   obtaining displacement information of a positional change between photographing ranges of the frames of the moving image following the one of the frames in which the first position of the indicator has been set and before it is determined that the specific motion has started; and
   adjusting, without considering the specific motion of the object, the first position of the indicator to a second position in the moving image such that a positional change from the first position to the second position matches the positional change corresponding to the obtained displacement information.

* * * * *